(12) United States Patent
Kawakami

(10) Patent No.: US 6,988,720 B2
(45) Date of Patent: Jan. 24, 2006

(54) CLAMPING DEVICE

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 10/507,407

(22) PCT Filed: Jan. 23, 2003

(86) PCT No.: PCT/JP03/00611

§ 371 (c)(1),
(2), (4) Date: Sep. 13, 2004

(87) PCT Pub. No.: WO03/076110

PCT Pub. Date: Sep. 18, 2003

(65) Prior Publication Data

US 2005/0121846 A1  Jun. 9, 2005

(30) Foreign Application Priority Data

Mar. 13, 2002 (JP) .............................. 2002-062899

(51) Int. Cl.
  B23B 3/00  (2006.01)
(52) U.S. Cl. ...................................... 269/309; 269/310

(58) Field of Classification Search ................ 269/309, 269/310, 289 R, 32
See application file for complete search history.

(56) References Cited

U.S. PATENT DOCUMENTS

| | | | | |
|---|---|---|---|---|
| 6,095,509 A | * | 8/2000 | Yonezawa | 269/309 |
| 6,598,713 B1 | * | 7/2003 | Kawakami | 188/67 |
| 6,755,409 B2 | * | 6/2004 | Yonezawa | 269/309 |
| 2004/0188908 A1 | * | 9/2004 | Kitaura | 269/309 |
| 2004/0256779 A1 | * | 12/2004 | Kawakami | 269/309 |
| 2005/0121846 A1 | * | 6/2005 | Kawakami | 269/309 |

FOREIGN PATENT DOCUMENTS

JP  11-188551  7/1999

\* cited by examiner

Primary Examiner—Lee D. Wilson
(74) Attorney, Agent, or Firm—Jordan and Hamburg LLP

(57) ABSTRACT

A clamping device 2 is provided with a hydraulic cylinder 7 for biasing a collet member 5 upward via a collet supporting member 6 and driving a pull rod 4 downward. A piston member 30 has a greater pressure receiving area than the collet supporting member 6 in the circular hydraulic chamber 31 of the hydraulic cylinder 7. Therefore, the hydraulic cylinder 7 can drive the pull rod 4 downward while the collet member 5 is biased upward. Meanwhile, the collet 5a of the collet member 5 is resiliently deformed in a diametrically expanding manner to engage in the vertical bore 1b of a workpiece 1 while slightly moving downward, ensuring a secure locking of the workpiece 1 to a workpiece receiving surface 3a.

2 Claims, 3 Drawing Sheets

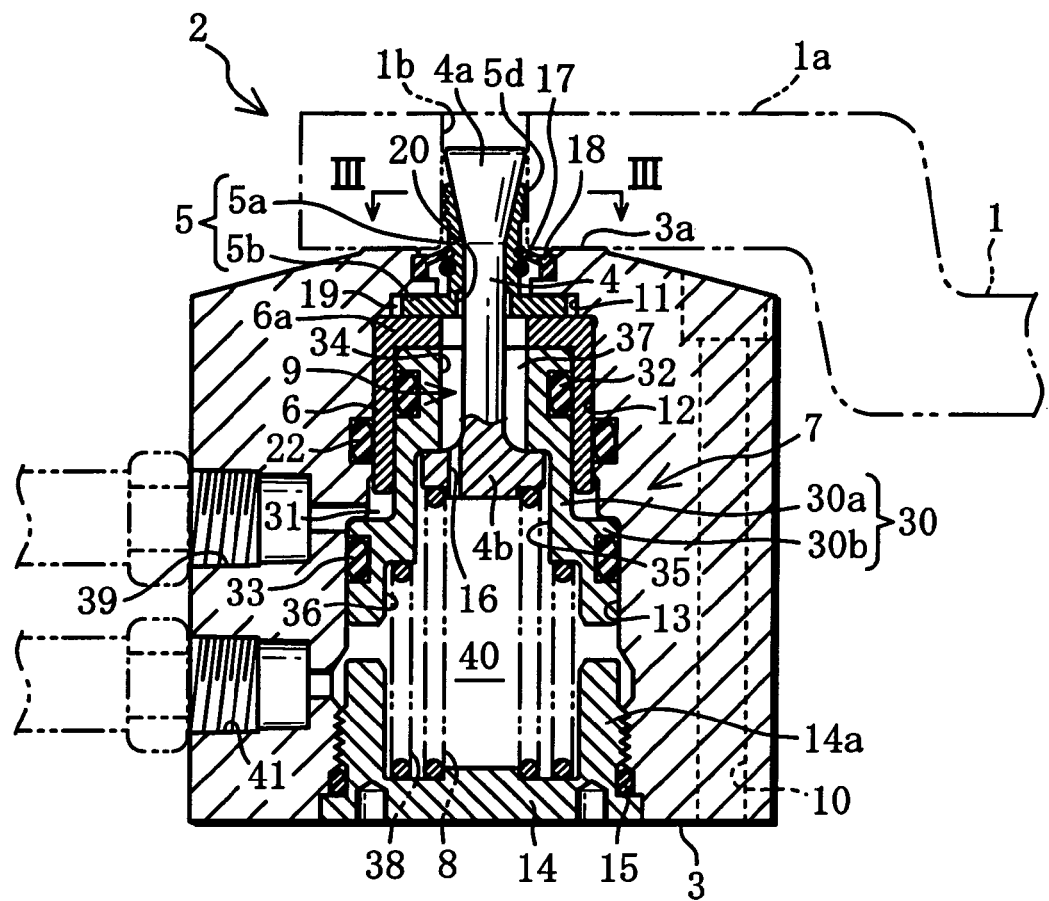
Fig. 1
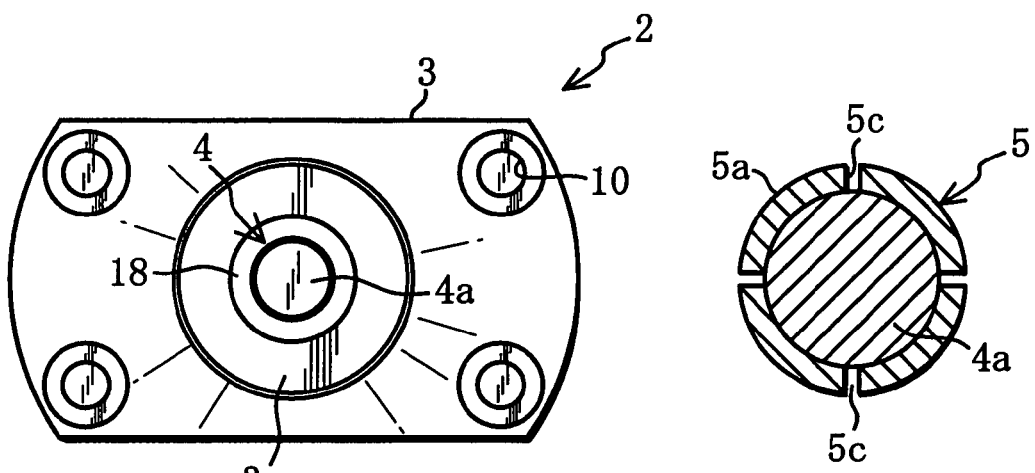
Fig. 2
Fig. 3

CLAMPING DEVICE

TECHNICAL FIELD

The present invention relates to a clamping device for clamping a workpiece by using a bore formed therein, and particularly relates to a clamping device in which a pull rod is retracted so that a collet fitted on the pull rod is elastically deformed in a diametrically expanding manner to lock the workpiece.

BACKGROUND OF THE INVENTION

Conventionally, a variety of clamping devices for locking a workpiece to be machined on a workpiece fixing table such as a workpiece pallet, have been proposed or are in practical use.

Among these, a clamping device for drawing and locking a workpiece to the table is described, for example, in Laid Open German Patent Publication DE-4020981-A1. As shown in FIG. 5, the clamping device 100 described in this publication has a clamping body 101 in which a pull rod 102 is provided to be vertically movable and protrudes upwardly. The pull rod 102 is provided at the top end with a tapered rod portion 102a having a tapered shape to increase the horizontal cross-sectional area toward the top. A collet member 103 is fitted on the upper part of the pull rod 102. The collet member 103 has a collet 103a fitted onto the tapered rod portion 102a, which is elastically deformable in a diametrically expanding manner.

The bottom end of the pull rod 102 is coupled to a piston 105 of hydraulic cylinder 104, which is able to drive the pull rod 102 downwardly. In addition, the pull rod 102 is biased upward by a spring 106.

On the other hand, the collet member 103 is supported by a collet supporting member 108, that is resiliently biased upward by coned disc springs 107.

For locking a workpiece W, hydraulic pressure is applied to the hydraulic cylinder 104, with the tapered rod portion 102a and collet 103a being inserted into a vertical bore Wa formed in the workpiece W. As a result, the pull rod 102 is driven downwardly to lower the tapered rod portion 102a. Since the collet member 103 is biased upward by the coned disc springs 107 via the collet supporting member 108, the collet 103a is slightly lowered and elastically deformed in a diametrically expanding manner along with the downward movement of the tapered part portion 102a, so that the collet 103a engages in the vertical bore Wa, and the workpiece W is drawn and locked to the workpiece receiving surface 101a of the clamp body 101.

In the clamping device described in Laid Open Japanese Patent Publication H11-188551, similar to above described clamping device, a collet member is supported by a collet supporting member from below, with the supporting member being biased upward by a coil spring. The pull rod is vertically driven by a double action hydraulic cylinder.

Problems to be solved by the present invention will be described hereafter.

In the clamping device of the former patent publication, the collet member is resiliently biased upward by the coned disc springs, which generally yields easily. Once coned disc springs yield, it is not assured that the collet is resiliently deformed in a diametrically expanding manner to lock the workpiece. Inevitably, the clamping device has reduced durability.

On the other hand, in the clamping device of the latter patent publication, the collet member is resiliently biased upward by a coil spring. Coil springs may also yield, but they are less likely to do so than the coned disc springs. However, it would be difficult to say that high durability is obtained thereby. Furthermore, a double acting type hydraulic cylinder is used to move the pull rod vertically to lock and unlock a workpiece. Hence, the hydraulic system must be switched each time a workpiece is locked and unlocked, complicating the switching operation.

The purpose of the present invention is to improve the durability of a clamping device and to facilitate the locking operation by using a hydraulic cylinder to bias a collet member upwardly.

DISCLOSURE OF THE INVENTION

The clamping device according to the present invention is engageable detachably with a vertical bore of a workpiece for locking it, comprising: a clamp body; a pull rod mounted in the clamp body in a manner such that it is vertically movable and protrudes upwardly; a tapered rod portion provided at the top end portion of the pull rod, having a diameter increasing toward the top; a collet member that has a collet fitted on the tapered rod portion and which is elastically deformable in a diametrically expanding manner, and which is slidably fitted on an upper half of the pull rod, an annular collet supporting member that abuts against a bottom of the collet member for supporting the collet member from below; and a hydraulic cylinder for biasing the collet supporting member upward and driving the pull rod downward; wherein the hydraulic cylinder comprises: a cylinder bore formed in the clamp body; a piston member slidably fitted into the cylinder bore for driving the pull rod downward; and an annular hydraulic chamber formed by the cylinder bore, piston member, and collet supporting member and the piston member has a greater pressure receiving area than a pressure receiving area of the collet supporting member in the annular hydraulic chamber.

The collet of the collet member is, for example, is circumferentially divided into multiple parts so that it is elastically deformable in a diametrically expanding manner, and is fitted on the tapered rod portion of the pull rod.

Prior to locking a workpiece, first, the tapered rod portion and the collet fitted thereon are inserted in a vertical workpiece locking bore formed in the workpiece from below, the workpiece being made to abut against the workpiece receiving surface provided on the top surface of the clamp body. In this state, hydraulic pressure is applied to the hydraulic cylinder to drive the pull rod downward and, simultaneously, bias the collet member upward via the collet supporting member.

In the hydraulic cylinder, there is provided an annular hydraulic chamber formed by the cylinder bore formed in the clamp body, a piston member for driving the pull rod downward, and a collet supporting member. In the cylindrical hydraulic chamber, the piston member is provided with a greater pressure receiving area than the pressure receiving area of the collet supporting member. Therefore, greater hydraulic pressure is applied to the piston member than to the collet supporting member. Thus, with the collet being biased upwardly, the piston member is pushed down and the tapered rod portion is moved downward. Then, the tapered rod portion forces the collet to elastically deform in a diametrically expanding manner and, simultaneously, slightly move downward so that the workpiece is drawn and locked to the workpiece receiving surface in a reliable manner.

Preferred modifications of the present invention are described as follows:

a) The collet supporting member has a top end wall at the top end, the upper half of the piston member is slidably fitted in the collet supporting member, and the top end of the piston member abuts against the bottom of the top end wall when hydraulic pressure in the annular hydraulic chamber is released to unlock the workpiece. The piston member is biased upward by a bias means for unlocking the clamp, such as a spring. The top end of the piston abuts against the bottom of the top end wall when hydraulic pressure in the annular hydraulic chamber is released to unlock the workpiece. The bias force is applied to the collet member by the bias means via the collet supporting member. Therefore, the collet member is also biased upwardly. Hence, there is no need of providing another bias means for preventing the collet member from coming down when the workpiece is unlocked.

b) The pull rod is horizontally movable by a specific small distance relative to the piston member and the collet member is horizontally movable relative to the clamp body together with the pull rod. Thus, the collet member is horizontally movable relative to the clamp body. The piston member is slidably fitted in the cylinder bore formed in the clamp body. Therefore, the pull rod is horizontally movable by a specific small distance relative to the clamp body. When the vertical workpiece bore is not axially aligned with the pull rod, the pull rod can be horizontally moved relative to the clamp body to align them.

c) A spring housing chamber is provided in the clamp body under the pull rod and springs for resiliently biasing the pull rod upward are placed in the spring housing chamber. Thus, when hydraulic pressure in the annular hydraulic chamber is released for unlocking the workpiece, the pull rod is biased upward by the springs so that the collet is disengaged from the vertical bore to unlock the workpiece.

d) An air blow means is provided for guiding pressurized air supplied to the spring housing chamber to the tip of the collet for ejecting it. The pressurized air is applied to the pull rod from below. Hence, the pull rod does not come down to lock the workpiece when the pressurized air is ejected from the tip of the collet for blowing air before or during the locking of the workpiece.

BRIEF DESCRIPTION OF THE DRAWINGS

FIG. 1 is a vertically cross-sectional view of a clamping device (unclamped state) according to an embodiment of the present invention.

FIG. 2 is a plane view of the clamping device.

FIG. 3 is a cross-sectional view along the line III—III in FIG. 1.

PREFERRED EMBODIMENT OF THE INVENTION

Figure 4:
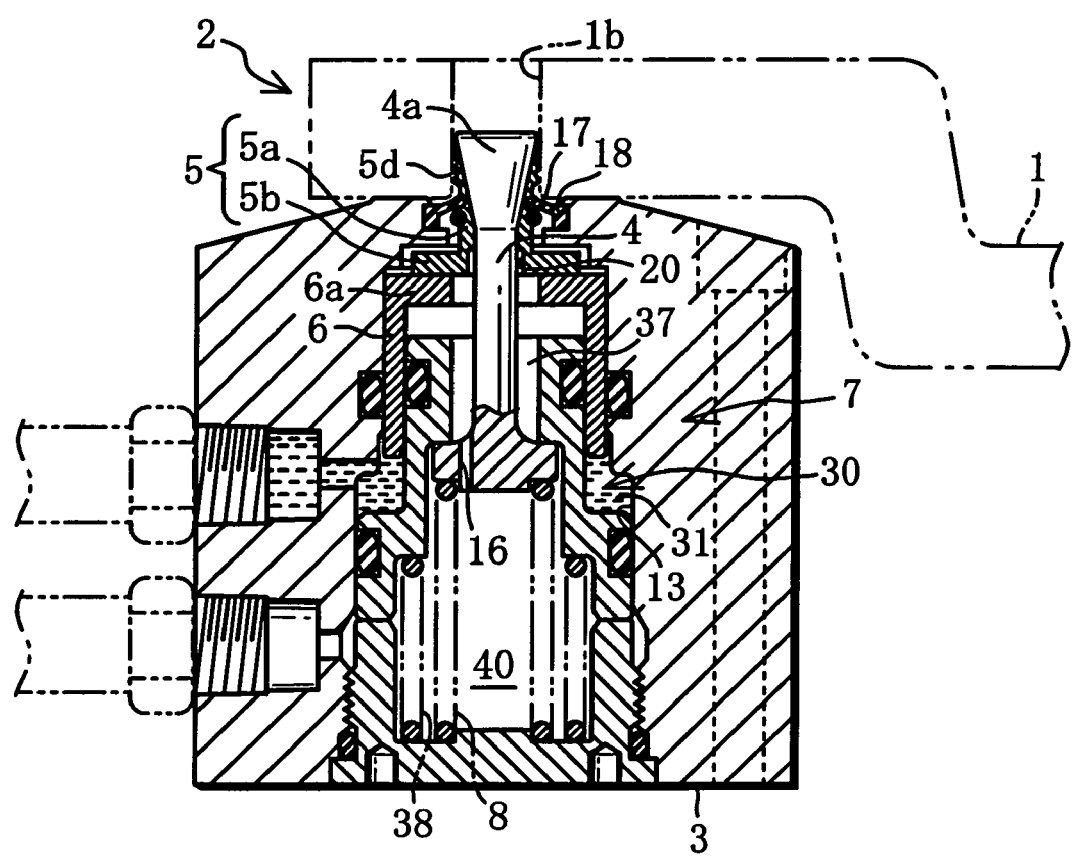
FIG. 4 is a vertically cross-sectional view of the clamping device (clamped state).
Figure 5:
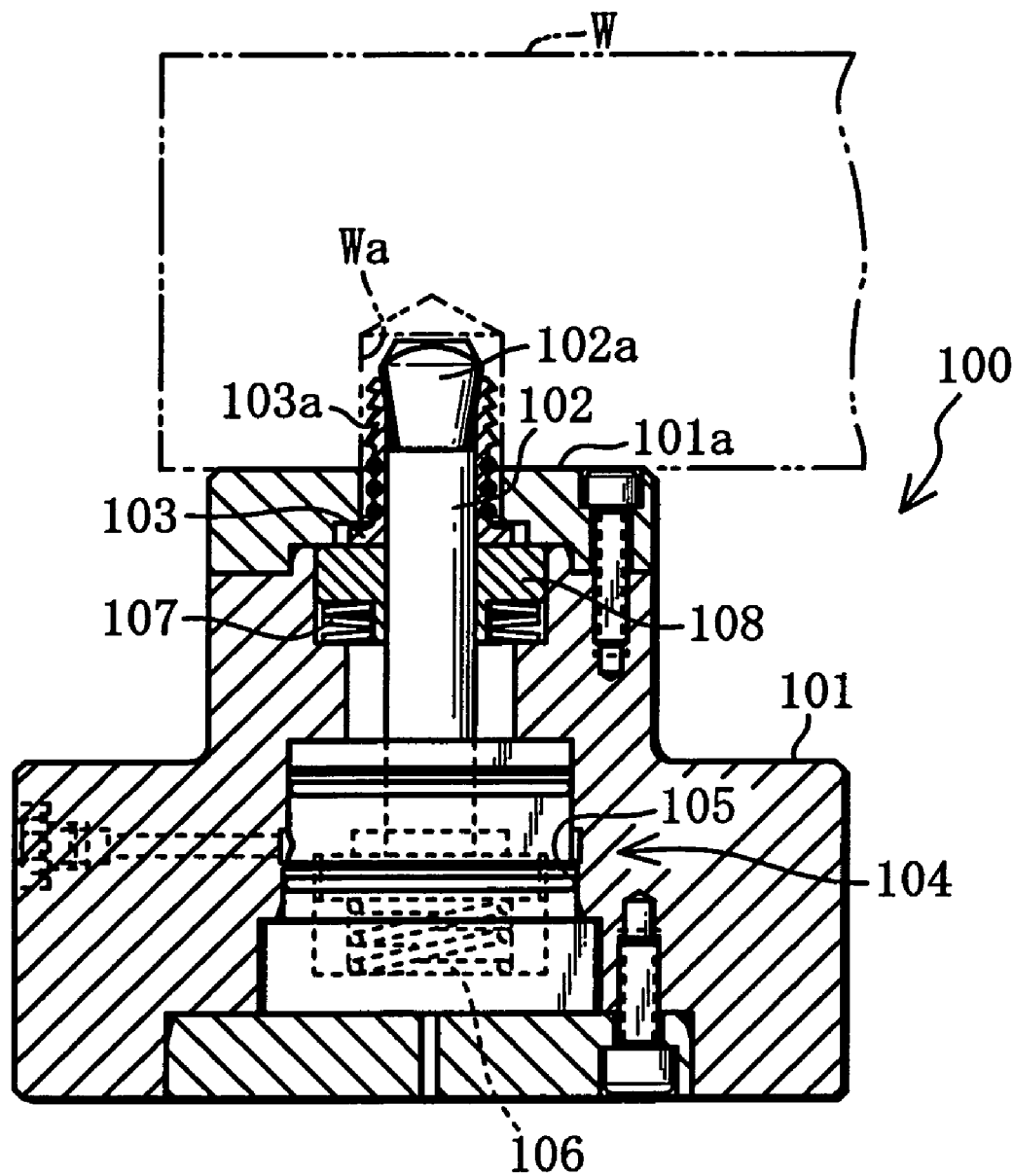
FIG. 5 is a vertically cross-sectional view of a prior art clamping device.

An embodiment of the present invention is described hereafter, with reference to the drawings. In this embodiment, the present invention is applied to a clamping device for locking a workpiece to machine it.

As shown in FIG. 1, a workpiece 1 to be machined has a flange 1a, through which a vertical bore 1b having a relatively small diameter (for example 6 mm) is formed for locking the workpiece 1.

For example, in order to machine the top surface of the flange 1a of the workpiece 1, plural clamping devices 2 are provided for locking the workpiece by utilizing vertical bores 1b formed through the flange 1a, on a work fixing base such as workpiece pallet (not shown).

As shown in FIGS. 1, 2, 4, an output portion of the clamping device 2 is detachably engaged in the vertical bore 1b of the workpiece 1 to lock the workpiece 1.

The clamping device 2 comprises a clamp body 3, a pull rod 4 mounted in the clamp body 3 in a manner in which it is vertically movable and protrudes upwardly, a tapered rod portion 4a provided at the top end portion of the pull rod 4 and having a diameter increasing toward the top, a collet member 5 having a collet 5a fitted on the tapered rod portion 4a and elastically deformable in a diametrically expanding manner and the collet member 5 is slidably fitted on the upper half of the pull rod 4, an annular collet supporting member 6 for supporting the collet member 5 from below, a hydraulic cylinder 7 for biasing the collet supporting member 6 upward and driving the pull rod 4 downward, an unclamping spring 8 for resiliently biasing the pull rod 4 upwardly, and an air blow mechanism 9 for ejecting pressurized air from the tip of the collet 5a.

As shown in FIG. 2, the clump body 3 has four bolt holes 10, through which bolts (not shown) are introduced to attach the clamp body 3 to the workpiece fix base. An annular workpiece receiving surface 3a for receiving a workpiece 1 is provided at the top of the clamp body 3.

The clamp body 3 is provided, from the top, with a housing bore 11 for housing a ring portion 5b of the collet member 5, a housing bore 12 having a slightly greater diameter than that of the housing bore 11 for housing a collet supporting member 6, and a cylinder bore 13 for a hydraulic cylinder 7, in series. An end wall member 14 having an upper cylindrical portion 14a is screwed into the clamp body 3 at the bottom to close the cylinder bore 13 from below. A sealing member 15 is attached between the clamp body 3 and the end wall member 14.

The tapered rod portion 4a of the pull rod 4 protrudes upward from the clamp body 3. The tapered rod portion 4a is inserted into the vertical bore 1b of the workpiece 1 from below for locking the workpiece 1. The lower two thirds of the pull rod 4 (excluding the tapered rod portion 4a) is vertically and movably housed in housing bores 11, 12. The pull rod 4 is provided with a piston 4b at the bottom end. A spring 8 abuts against the bottom of the piston 4b. The pull rod 4 is elastically biased upward by the spring 8. A vertical air passage 16 is formed through the piston 4b for passing pressurized air upwardly.

The collet member 5 is integrally formed with a collet 5a and a ring 5b at the lower side of the collet 5a. The upper half of the collet 5a protrudes upward from the clamp body 3 together with the tapered rod portion 4a. When locking workpiece 1, the collet 5a is inserted in the vertical bore 1b of the workpiece 1 from below while being fitted on the tapered rod portion 4a. As shown in FIG. 3, the upper half of the collet 5a is circumferentially divided into four parts by slits 5c. Furthermore, as shown FIG. 1, engaging portion 5d having plural annular grooves is provided on the outer periphery of the collet 5a. When the tapered rod portion 4a is moved downward relative to the collet 5a, the tapered rod portion 4a pushes the collet 5a outward so that the collet 5a is elastically deformed in a diametrically expanding manner and the engaging portion 5d is engaged with the inner periphery of the vertical bore 1b of the workpiece 1.

A metal ring member 17 for biasing the collet 5a in a diametrically contracting manner is provided at the lower half of the collet 5a. In addition, a synthetic rubber dust seal 18 for biasing the collet 5a in a diametrically contracting manner as is the ring member 17 and preventing contaminants such as cuttings from invading the clamp body 3 is attached to the top end of the clamp body 3.

The ring portion 5b is housed in the housing bore 11 with its upward movement latched. A annular space 19 is formed between the ring portion 5b and housing bore 11. The collet member 5 can be moved horizontally relative to the clamp body 3 together with pull rod 4. A annular air passage 20 for pressurized air is formed between the ring portion 5b and pull rod 4.

The collet supporting member 6 is fitted in the housing bore 12 in a vertically slidable manner with its upward movement being restricted by a step formed between housing bores 11, 12. The collet supporting member 6 has a top end wall 6a at the top end, which abuts against the bottom of the ring portion 5b. A sealing member 22 is provided between the collet supporting member 6 and housing bore 12.

The hydraulic cylinder 7 comprises a cylinder bore 13, a piston member 30 that is slidably fitted in the cylinder bore 13 for driving the pull rod 4 upwardly, and an annular hydraulic chamber 31 formed by the cylinder bore 13, piston member 30, and collet supporting member 6.

The piston member 30 is integrally formed by its upper half, smaller diameter cylindrical portion 30a that is slidably fitted in the collet supporting member 6 and a lower half, greater diameter cylindrical portion 30b that is slidably fitted in the cylinder bore 13. The upward movement of the greater diameter cylindrical portion 30b is restricted by a step between the housing bore 12 and cylinder bore 13. Sealing members 32, 33 are attached between the collet supporting member 6 and smaller diameter cylinder portion 30a and between the cylinder bore 13 and greater diameter cylinder portion 30b, respectively.

The piston member 30 has, from the top, a rod insert bore 34 for inserting the pull rod 4, a piston housing bore 35 having a greater diameter than the rod insert bore 34 for housing the piston 4b, and a large diameter bore 36 having a greater diameter than the piston housing bore 35 in series. The lower half of the pull rod 4 is inserted into the rod insert bore 34 in a vertically movable manner. The piston 4b is housed in the piston housing bore 35 surrounded by an annular space. The pull rod 4 is horizontally movable by a specific small distance relative to the piston member 30. The piston portion 4b is elastically biased upward by the spring 8 and is engaged with the step formed between the rod insert bore 34 and piston housing bore 35. An air passage 37 for pressurized air is formed between the rod insert bore 34 and pull rod 4.

A spring 38 abuts against the piston member 30 at the step formed between the piston housing 35 and large diameter bore 36 so that the piston member 30 is elastically biased upward by the spring 38.

The annular hydraulic chamber 31 is coupled to a hydraulic pressure supply source (not shown) via a hydraulic port 39 formed in the clamp body 3. When hydraulic pressure is applied to the annular hydraulic chamber 31 from the hydraulic pressure supply source, the collet supporting member 6 receives hydraulic pressure at the bottom, and is biased upwardly. On the other hand, as shown in FIGS. 1, 4, the top surface of the greater diameter cylinder portion 30b has a greater area than the bottom surface of the collet supporting member 6. Hence, the piston member 30 has a greater pressure receiving area than that of the collet supporting member 6 in the annular hydraulic chamber 31.

When hydraulic pressure is applied in the annular hydraulic chamber 31, because of the difference in pressure receiving area, a clamp force for driving the pull rod 4 downward via the piston member 30 is generated in the annular hydraulic chamber 31.

As shown in FIG. 1, when hydraulic pressure in the annular hydraulic chamber 31 is released to unlock the workpiece 1, the piston member 30 is elastically biased upward by the spring 38 and, therefore, the top end of the piston member 30 abuts against the top end wall 6a of the collet supporting member 6 so that the collet member 5 is raised to its upper most position.

A spring housing chamber 40 is formed by the greater diameter cylindrical portion 30 of the piston member 30 and the cylindrical portion 14a of the end wall member 14 in the clamp body 3 below the pull rod 4. Two springs 8, 38, described above, are placed in the spring housing chamber 40.

The air blow mechanism 9 is provided for guiding pressurized air supplied to the spring housing chamber 40 to the tip of the collet 5a and ejecting it to eliminate contaminants such as cuttings adhering to the tapered rod portion 4a and collet 5a when locking the workpiece.

The air blow mechanism 9 comprises a spring housing chamber 40, an air port 41 formed in the clamp body 3, air passages 16, 37, 20, and slits 5c of collet 5a. The air port 41 is coupled to an external air source (not shown). Supplied from the air source to the spring housing chamber 40 via the air port 41, pressurized air passes through the air passages 16, 37, 20 and reaches the slits 5c of collet 5a, where it is ejected to prevent contaminants from adhering to the tapered rod portion 4a and collet 5a.

The operation of the clamping device 2 is described hereafter.

For locking the workpiece 1, as shown in FIG. 1, first, the tapered rod portion 4a and the upper half of the collet 5a are inserted into the vertical bore 1b of the workpiece 1 from below and the workpiece 1 is set to about against the workpiece receiving surface 3a. Then, the air blow mechanism 9 is activated, and pressurized air is supplied to the spring housing chamber 40 via the air port 41 and ejected from the collet 5a via air passages 16, 37, 20.

When hydraulic pressure is applied to the hydraulic chamber 31 in the state above, as shown in FIG. 4, the collet supporting member 6 is biased upward and a clamp force for driving the piston member 30 downward is produced because of the difference in pressure receiving area between the piston member 30 and collet supporting member 6 in the hydraulic chamber 31. Here, the piston 4b of the pull rod 4 is resiliently biased upward by the spring 8 and, because the pull rod 4 is engaged with the piston member 30, the pull rod 4 is also driven downward.

Pressurized air for the air blow is supplied to the spring housing chamber 40 below the pull rod 4, serving to drive the pull rod 4 upwardly, preventing the pull rod 4 from coming down to lock the workpiece 1.

When the pull rod 4 is lowered with the collet member 5 biased upward via the collet supporting member 6, the tapered rod portion 4a moves downward relative to the collet 5a and forces the collet 5a to elastically deform in a diametrically expanding manner, so that the engaging parts 5d are engaged in the vertical bore 1b, the collet 5a being engaged in the vertical bore 1b as it is slightly pushed down by the tapered rod portion 4a, drawing, the workpiece 1 to the workpiece receiving surface 3a for secure locking, at which point the pressurized air supplied to the spring housing chamber 40 is stopped.

For unlocking the workpiece 1 after it is machined while being locked to the workpiece fixing base, as shown FIG. 1, hydraulic pressure in the annular hydraulic chamber 31 is released so that the pull rod 4 and piston member 30 are raised by the elastic bias force of springs 8, 38.

The top end of the piston member 30 abuts against the top end wall 6a of the collet supporting member 6. The collet member 5 is pushed upward until the ring portion 5b abuts against the top end of the housing bore 11. The pull rod 4 is further driven upward and the tapered rod portion 4a moves upward relative to the collet 5a, which is elastically deformed by the ring member 17 and dust seal 18 in a diametrically contracting manner so that the engaging portion 5d is disengaged from the vertical bore 1b.

According to the clamping device 2 described above the following advantages can be achieved.

1) The piston member 30 has a greater pressure receiving area than that of the collet supporting member 6 in the annular hydraulic chamber 31. Therefore, the piston member 30 receives a greater hydraulic force than the collet supporting member 6 so that the collet member 5 is biased upward and the pull rod 4 is driven downward. When the collet 5a is elastically deformed in a diametrically expanding manner to engage with the vertical bore 1b, the collet 5a slightly moves downward so that the workpiece 1 is drawn to the workpiece receiving surface 3a to provide a secure lock. The collet member 5 is biased upward by the hydraulic cylinder 7. This eliminates factors responsible for decreasing bias force to the collet member 5 after the long term use of the clamping device 2, as with the yield of a spring, such as a dish-shaped spring and a coil spring, used to provide a bias. Hence, the clamping device 2 has improved durability.

2) When the workpiece 1 is unlocked with hydraulic pressure in the annular hydraulic chamber 31 being released, the top end of the piston 30 abuts against the bottom of the top end wall 6a. With the workpiece 1 being unlocked, the collet member 5 is also biased upward by the unclamping springs 8, 38 for biasing the piston member 30 upwardly, eliminating the need of another bias means for preventing the collet member 5 from coming down.

3) The pull rod 4 is horizontally movable by a specific small distance relative to the piston member 30. The collet member 5 is horizontally movable relative to the clamp body 3 together with the pull rod 4. When the workpiece 1 is to be locked using multiple clamping devices 2 and the vertical bore 1b of the workpiece 1 is not axially aligned with the pull rod 4 with any of the clamping devices 2, the pull rod 4 can be horizontally moved relative to the clamp body 3 to align them.

4) The pressure of pressurized air is applied to the pull rod 4 from below, preventing the pull rod 4 from coming down to lock the workpiece 1 before the hydraulic cylinder 7 drives the pull rod 4 downward.

5) Collet 5a is provided with a ring member 17 and dust seal 18 for biasing the collet 5a in a diametrically contracting manner, preventing contaminants from invading the clamp body 3 and serving to resiliently deform the collet 5a in a diametrically contracting manner for disengaging it from the vertical bore 1b when hydraulic pressure in the hydraulic chamber 31 is released.

The modified embodiments modified partially the clamping device described above are described hereafter.

1] The collet 5a can be divided at a single point to form a C-letter shape or at any number of points other than four.

2] The spring 38 can be omitted where the spring 8 provides sufficient unclamping force.

The present invention is not restricted to the embodiments described above and may include modifications by those skilled in the art without departing from the scope of the present invention.

What is claimed is:

1. A clamping device that is engageable detachably with a vertical bore of a workpiece for locking it, comprising:
   a clamp body,
   a pull rod mounted in the clamp body in a manner in which it is vertically movable and protrudes upwardly,
   a tapered rod portion provided at the top end portion of the pull rod and having a diameter increasing toward the top,
   a collet member provided with a collet fitted on the tapered rod portion, which is elastically deformable in a diametrically expanding manner and which is slidably fitted on an upper half of the pull rod,
   an annular collet supporting member that abuts against a bottom of the collet member for supporting the collet member from below, and
   a hydraulic cylinder for biasing the collet supporting member upward and driving the pull rod downward;
   wherein the hydraulic cylinder comprises:
   a cylinder bore formed in the clamp body,
   a piston member slidably fitted in the cylinder bore for driving the pull rod downward,
   an annular hydraulic chamber formed by the cylinder bore, piston member, and collet supporting member, wherein the piston member has a greater pressure receiving area than a pressure receiving area of the collet supporting member in the annular hydraulic chamber; and
   wherein the pull rod is horizontally movable by a specific small distance relative to the piston member, and the collet member is horizontally movable relative to the clamp body together with the pull rod.

2. A clamping device that is engageable detachably with a vertical bore of a workpiece for locking it, comprising:
   a clamp body,
   a pull rod mounted in the clamp body in a manner in which it is vertically movable and protrudes upwardly,
   a tapered rod portion provided at the top end portion of the pull rod and having a diameter increasing toward the top,
   a collet member provided with a collet fitted on the tapered rod portion, which is elastically deformable in a diametrically expanding manner and which is slidably fitted on an upper half of the pull rod,
   an annular collet supporting member that abuts against a bottom of the collet member for supporting the collet member from below, and
   a hydraulic cylinder for biasing the collet supporting member upward and driving the pull rod downward;
   wherein the hydraulic cylinder comprises:
   a cylinder bore formed in the clamp body,
   a piston member slidably fitted in the cylinder bore for driving the pull rod downward,
   an annular hydraulic chamber formed by the cylinder bore, piston member, and collet supporting member, wherein the piston member has a greater pressure receiving area than a pressure receiving area of the collet supporting member in the annular hydraulic chamber;
   wherein the collet supporting member has a top end wall at the top end, the upper half of the piston member is slidably fitted in the collet supporting member, and the top end of the piston member abuts against the bottom of the top end wall when hydraulic pressure in the annular hydraulic chamber is released to unlock the workpiece; and wherein the pull rod is horizontally movable by a specific small distance relative to the piston member, and the collet member is horizontally movable relative to the clamp body together with the pull rod.

* * * * *